United States Patent
Xu

(10) Patent No.: US 12,161,088 B2
(45) Date of Patent: Dec. 10, 2024

(54) ARTIFICIAL BULLY STICK OF EDIBLE PET CHEW

(71) Applicant: SHANGHAI SUNLIGHT INNOV TRADING CO., LTD., Shanghai (CN)

(72) Inventor: Guangqiang Xu, Shanghai (CN)

(73) Assignee: SHANGHAI SUNLIGHT INNOV TRADING CO., LTD., Shanghai (CN)

( * ) Notice: Subject to any disclaimer, the term of this patent is extended or adjusted under 35 U.S.C. 154(b) by 354 days.

(21) Appl. No.: 17/478,986

(22) Filed: Sep. 20, 2021

(65) Prior Publication Data

US 2022/0000073 A1 Jan. 6, 2022

Related U.S. Application Data

(63) Continuation-in-part of application No. 16/190,118, filed on Nov. 13, 2018, now Pat. No. 11,122,820, which is a continuation-in-part of application No. 15/680,721, filed on Aug. 18, 2017, now Pat. No. 10,159,266.

(30) Foreign Application Priority Data

Aug. 15, 2017 (CN) .......................... 201710697772.9

(51) Int. Cl.
| | | |
|---|---|---|
| *A01K 15/02* | (2006.01) | |
| *A23K 10/22* | (2016.01) | |
| *A23K 10/30* | (2016.01) | |
| *A23K 30/12* | (2016.01) | |
| *A23K 30/20* | (2016.01) | |
| *A23K 40/25* | (2016.01) | |
| *A23K 50/42* | (2016.01) | |

(52) U.S. Cl.
CPC ............ *A01K 15/026* (2013.01); *A23K 10/22* (2016.05); *A23K 10/30* (2016.05); *A23K 30/12* (2016.05); *A23K 30/20* (2016.05); *A23K 40/25* (2016.05); *A23K 50/42* (2016.05)

(58) Field of Classification Search
CPC .... A01K 15/026; A01K 15/025; A23K 40/25; A23K 10/20; A23K 10/26; A23K 10/30; A23K 50/40; A23K 50/42; A23K 20/158; A23K 17/005
See application file for complete search history.

(56) References Cited

U.S. PATENT DOCUMENTS

| | | | | |
|---|---|---|---|---|
| 7,691,426 B2 * | 4/2010 | Axelrod | ................. | A23K 40/25 |
| | | | | 119/710 |
| 2008/0118606 A1 * | 5/2008 | Stern | .................... | A23N 17/005 |
| | | | | 426/282 |
| 2014/0363537 A1 * | 12/2014 | Doerr | ................... | A23K 20/189 |
| | | | | 426/63 |

* cited by examiner

*Primary Examiner* — Trinh T Nguyen
(74) *Attorney, Agent, or Firm* — Xuan Zhang

(57) ABSTRACT

An edible pet chew includes a member of Bully Stick Analogue formed from a composition material may be with at least 20% plant ingredient imitating existing traditional bully stick products, serving as an alternative to it. The imitation may include the structure, and/or appearance, and/or shape, and/or size, and/or color, and/or texture, and/or flavor, and/or durability, and/or palatability of traditional bully stick. It is an extruded stick processed by an extruder or a stick formed by injection molding machine.

19 Claims, 10 Drawing Sheets

ARTIFICIAL BULLY STICK OF EDIBLE PET CHEW

CROSS-REFERENCE TO RELATED APPLICATIONS

This application is a CIP application of, and claims priority benefit to U.S. application Ser. No. 16/190,118, filed on Nov. 13, 2018, which is a CIP of U.S. application Ser. No. 15/680,721, filed on Aug. 18, 2017, now patent Ser. No. 10/159,266.

This application also claims priority to CN Application No. 201710697772.9 filed on Aug. 15, 2017.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT DISCLOSURE

Field of Disclosure

The field of this disclosure relates to an Edible Pet Chew, and more particularly to an artificial bully stick (bully stick analogue) of edible pet chew.

Description of Related Arts

Domestic pets, primarily dogs, have an instinct to chew which keeps their teeth healthy, exercises their jaws and teeth and keeps teeth clean. "Pet Chew" products have been introduced to the market for many years to accommodate that instinctive urge to chew in a healthy direction.

"Pet Chews" are intended to be chewed by a pet/dog for an extended period of time before being digested. A great part of pet chew products in the market are traditional Bully Sticks welcome very much by dogs and consumers, which are made of natural bovine penis. Generally foreskin of bovine penis is removed, cleaned and then dehydrated by for example heating or freeze-drying. It enjoys an inherent "good palatability" and "durability (after dehydrating process)" which makes it an outstanding successful product in the trade.

However, traditional bully stick products have some drawbacks, such as:
1. Extremely high price per gram. Due to the natural scarcity property with the source of natural bovine pizzle, raw materials (bovine pizzle) for producing traditional bully sticks are sold at an extremely high price, which creates the final products, traditional bully sticks, being sold to consumers at an extremely high price.
2. Materially hard to acquisition due to natural scarcity property with the source of natural bovine pizzle.
3. Strong unpleasant stink/smell which keeps a lot of consumers away from buying it.
4. Too great strength or rigidity. Bully stick products have inherently extremely great strength which is not in favor of puppies or old dogs with weak jaws or teeth.

In the market, there's another popular product in a form of injection-molded or extruded stick, typically formulated by plant based materials, enjoying the benefits of low-cost raw materials. Also, it is a product with "durability" property which can provide a long chewing time for dogs. However these kinds of product are commercialized by many distributors or retailers under great competitions. The competition is a homogeneous one, in which a product is hard to be well distinguished from another. A homogeneity product is hard to attract consumers to buy.

What is required is to provide a pet chew overcoming the drawbacks above-mentioned accompanying the existing traditional bully stick products and extruded, injection-moulding, cast moulding or compression moulding stick products.

U.S. application Ser. No. 13/858,592 by Shrestha, filed on Apr. 8, 2013, disclosed a pet chew including a hardened cheese and a dry animal tissue such as bully sticks attached to the cheese piece. And it also disclosed a kind of animal tissue puff such as bully puff. However, the bully sticks or bully puff it attempted to apply as still is traditional bully sticks, no new matters. It still has the drawbacks of traditionally bully stick as aforementioned.

U.S. Pat. No. 8,479,687 by Anderson, filed on Feb. 14, 2007, disclosed a pet chew with rawhide and traditional bully stick (or steer penis) woven together. Since it's still a traditional bully stick product, it suffers the drawbacks of traditional bully stick aforementioned.

US patent application no. U.S. Pat. No. 8,074,609B2 by Grant Adkins, filed on Mar. 25, 2010, disclosed a rawhide pet chew with a traditional bully stick wrapped in. But since it's still a traditional bully stick product, it suffers the drawbacks of traditional bully stick aforementioned.

U.S. Pat. No. 7,677,203 by Stern, filed on Nov. 21, 2006, disclosed a pet chew with a plant based outer casing and a chewy edible material positioned within the casing. However, it is silent about an intention to make a bully-stick-like product imitating bully stick. The products it disclosed have nothing to do with traditional bully stick, which does not have any features of imitating traditional bully stick. And also it fails to disclose a molded, injection-molded or extruded pet chew with animal pizzle ingredient.

US application no 14/295,009 by Doerr, filed on Jun. 3, 2014, disclosed a pet chew including an amylase filling and a collagen casing. However it is silent about an intention to form a pet chew that is an artificial bully stick (or Bully-Stick-LIKE, or bully stick analogue). It lacks of the necessary features that a traditional bully stick presents, such as bully stick shapes and structure. Thus it fails to attract consumers by working as a new product alternative to traditional bull stick product. Furthermore, it has a filling center that may use 40% bully pizzle material, however it fails to disclose how many pizzle ingredient percentage in weight exists in whole product formula. A disadvantage with this product is that, it has a collagen outer casing, where collagen material is considered to incur some disadvantages such as: A, collagen material is not inherently attractive making it fail to urge dogs to chew; B, manufacture of animal hide and collagen is relatively unregulated industry. It may create pollution to environment. $H_2O_2$ and NaOH chemicals that are used for rawhide manufacture and heavy metals may remain in finished products which harm dogs' health.

Attention is also directed to U.S. Pat. No. 7,691,426 by Doerr Axelrod, filed on Jun. 9, 2006, disclosed an animal chew combining a rawhide member and edible resin one.

SUMMARY OF THE PRESENT DISCLOSURE

An objective of the present disclosure is to provide a pet chew stick with plant ingredient and animal ingredient (typically meat and/or meat-by-products materials) imitating or approximating traditional bully stick products which is very much welcome by dogs and their owners.

An embodiment of the present disclosure is to provide a pet chew stick with pizzle ingredient imitating or approximating traditional bully stick products.

An objective of the present disclosure is to provide a pet chew with both "inherently good palatability" and "durability" simultaneously.

An objective of the present disclosure is to provide an edible pet chew serving as an alternative to existing traditional Bully Stick product by imitating/approximating the structure, and/or shape, and/or appearance, and/or size, and/or color, and/or texture, and/or flavor, and/or durability, and/or palatability of traditional bully stick.

An objective of the present disclosure is to provide an edible pet chew incorporating some features from two existing popular products into a single product, where the two existing products are plant based extruded (or injection-molding-shaped) stick product and traditional bully stick product.

An embodiment of the present disclosure, it is to provide an edible pet chew with an outer layer and an inner member, and the outer layer is with good durability and strength, which imitates a feature of traditional bully stick.

An embodiment of the present disclosure is to provide a bully stick analogue pet chew with a bully stick analogue member formed from a single piece of material that may not include outer layer or inner segment, which imitates a feature of traditional bully stick.

In one embodiment of the present disclosure, a bully stick analogue pet chew is provided with one or more bully stick analogue member(s) being manipulated/shaped to a stick shape, a twisted stick configuration, a spiral shape, a pretzel knot, a knotted bone shape, a ring shape or a woven braid configuration alternatively before being hardened to a final product.

One embodiment of the present disclosure is to provide a bully stick analogue pet chew with a bully stick analogue member formed from a single piece of material without divided segments, with a longitudinal hole running through the length of the chew stick.

One embodiment of the present disclosure is to provide a bully stick analogue pet chew with a bully stick analogue member formed from a single piece of material with bubbles existing inside the chew stick.

An objective of the present disclosure is to provide an edible pet chew stick with a cross section outline shape similar to that of traditional bully sticks.

An objective of the present disclosure is to provide an edible pet chew formed from a composition material.

An objective of the present disclosure is to provide an Artificial Bully Stick (or Bully-Stick-LIKE, or bully stick analogue) pet chew which is hugely cheaper than traditional bully stick.

An objective of the present disclosure is to provide an Artificial Bully Stick (bully stick analogue) pet chew which is raw-material-acquisition comparatively hugely easier than traditional bully stick.

An embodiment of the present disclosure is to provide an edible pet chew stick with pizzle material. The stick is obtained by extruding process with an extruder, to achieve the "chewy" property of the pet chew products.

An objective of the present disclosure is to provide an edible pet chew with limited animal hide ingredient in the products or even without animal hide ingredient.

In one aspect of the present disclosure, an edible pet chew is provided including an Artificial Bully Stick (bully stick analogue) chew member and an additional edible material member being assembled together.

In one embodiment of the present disclosure, an edible pet chew includes an Artificial Bully Stick member and an additional edible material member of animal pizzle material being assembled together.

In another embodiment of the present disclosure, an edible pet chew includes an Artificial Bully Stick member and an additional edible material member of animal hide material being assembled together.

In yet another embodiment of the present disclosure, an edible pet chew includes an Artificial Bully Stick member and more than one additional ball-shaped edible material members being assembled together, forming a kabob configuration product.

Additional embodiments of the present disclosure will become apparent from the description which follows, and may be realized by means of the instrumentalities and combinations particular point out in the appended claims.

Still further embodiments will become apparent from a consideration of the ensuing description and drawings.

These and other embodiments of the present disclosure will become apparent from the following detailed description, the accompanying drawings, and the appended claims.

DETAILED DESCRIPTION OF THE DISCLOSURE

Embodiments are provided in the following description only as examples. The general principles defined in the following description would be applied to other embodiments, alternatives, modifications, equivalents, and applications without departing from the spirit and scope of the present disclosure.

It should be noted that the term of "Bully stick" refers to a pet chew product of dehydrated animal (especially but not limited to bovine animal, bovine especially referring to bull or steer) pizzle, or segment thereof, for dogs to chew on, where the pizzle is derived from a natural animal penis cut from slaughtered animals (especially bovine), typically with foreskin being removed. The term of "pizzle" refers to the penis of an animal. Bovine (especially bull or steer) penis is known in pet chew trade as pizzle. This bully stick is so called traditional bully stick made of a dehydrated natural part of an animal (especially bovine).

Pet chew stick of the present disclosure is intended to work as an alternative to traditional (GENUINE) Bully Sticks aforementioned.

The term of "Bully Stick Analogue" pet chew (or say Bully-Stick-LIKE pet chew, or Artificial Bully Stick pet chew) in the present disclosure refers a pet chew or a pet chew member in a shape of stick formed from a composition material, imitating or approximating the features of traditional (GENUINE) bully stick product including the structure, and/or shape, and/or appearance, and/or size, and/or color, and/or texture, and/or flavor, and/or durability, and/or palatability, but it is not a traditional (GENUINE) bully stick.

Figure 3:
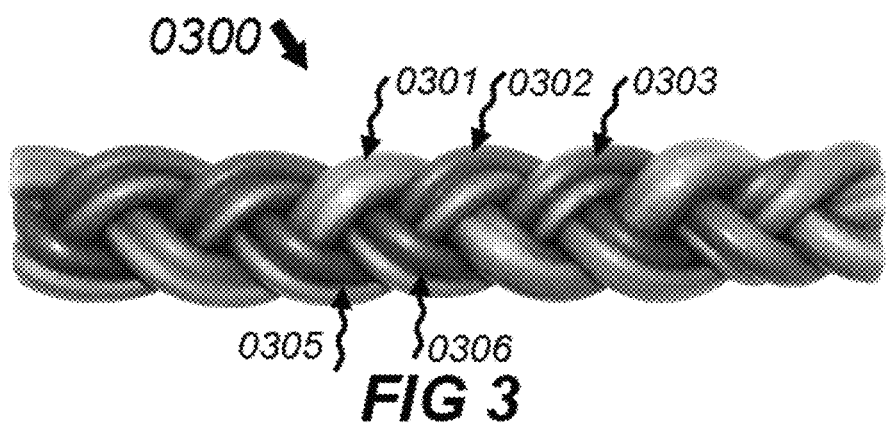
FIG. 3 is a top plan view of a pet chew according to the disclosure with three separate piece members of Artificial Bully Stick, being woven together.
Figure 4:
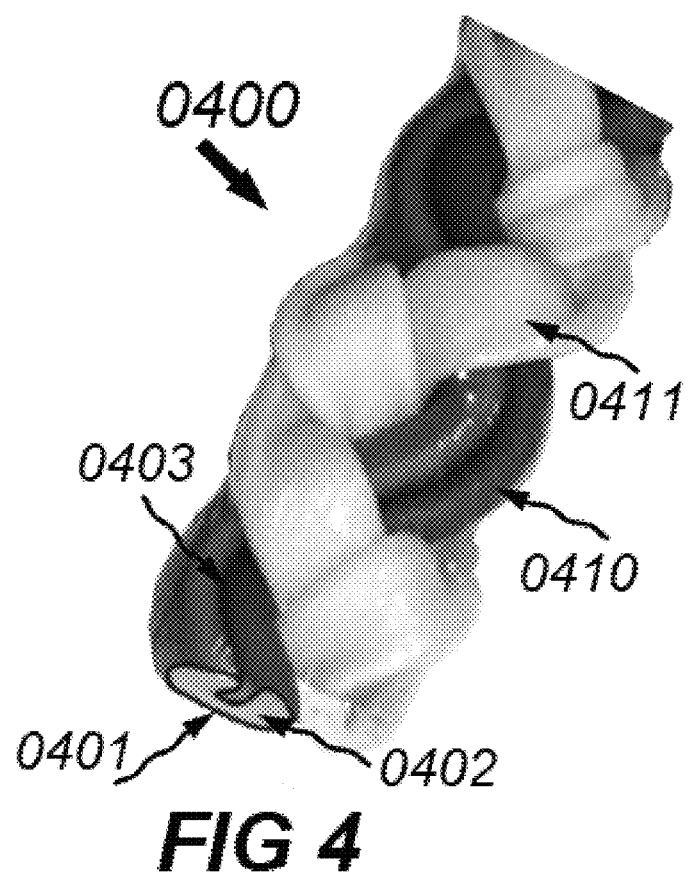
FIG. 4 is a top plan view of an Artificial Bully Stick pet chew according to the disclosure in a braid configuration with two pieces of rawhide sheet and a piece of artificial bully stick member being woven together.

It is known that a market-popular pet chew product should include two major factors, i.e. property of "chewy" (durability) and property of "inherently good palatability". "Chewy" means a material that can endure a dog's chewing for a long time before being ingested. "Good palatability" means a material with inherent attractant to dogs without adding additional artificial flavorings. A market-successful pet chew product may be required to have both properties. The Artificial Bully Stick pet chew disclosed by the present disclosure may be a product with both "inherently good palatability" and "durability". The term of "Single piece" or "one-piece" refers to a material consisting of or made in a single undivided piece that may not have divided or separate segments therein. The "single piece of material" is not the one that is formed from plural pieces that have been joined or welded together. For example, the pet chews as illustrated in FIGS. 1, 2, 5, 15, 16, 17 and 19 include chew sticks formed from a single piece of material. But the artificial bully stick chew stick members from the pet chews as illustrated in FIGS. 3 and 4 are in a configuration with outer layer and inner member, which are not considered as being formed from a "single piece of material".

Figure 6:
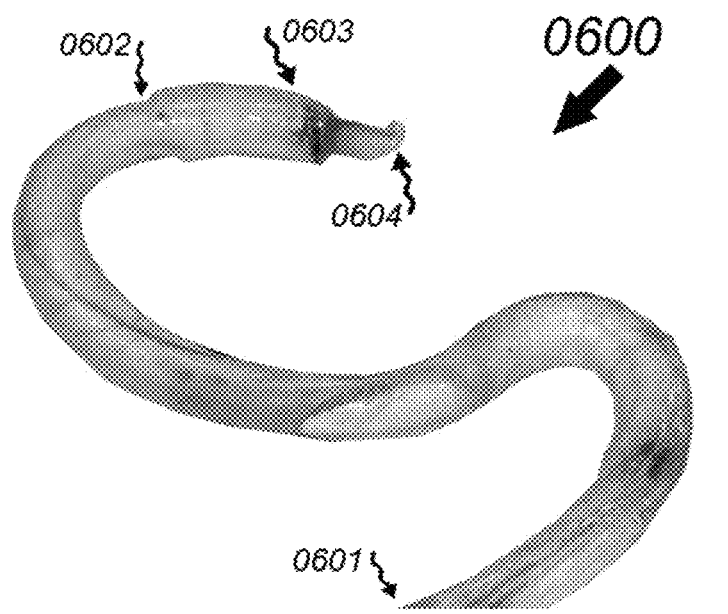
FIG. 6 is a prior art, a top plan view of a natural flesh of pizzle in a full length configuration, which works as a starting material for producing traditional bully stick.

Before disclosing embodiments of the present disclosure, as a prior art, let's address a typical specification/structure/configuration and manufacturing process for these traditional (GENUINE) Bully Stick products as follows (from points 1 to 6):

1. Prepare natural flesh of pizzle. Now refer to FIG. 6 (Prior Art), 0600 gets ready which is cut from a slaughtered bovine animal. 0600 refers to a kind of full length pizzle including both shaft and glans penis part, where the glans part serves as a tapered tail of the whole pizzle, alternatively being tapered to a pointed tip or a rounded tip. 0601 refers to the root of the bovine penis. The shaft part from point 0601 to 0602 is a typical portion of pizzle that is universally applied to make Bully Sticks. 0603 is glans of the pizzle, which also can be included in finished products in some specific products (these specific products may be called full length bully sticks). 0604 refers to the pointed tip of the glans penis, the tapered tail part of the full length pizzle.

Figure 7:
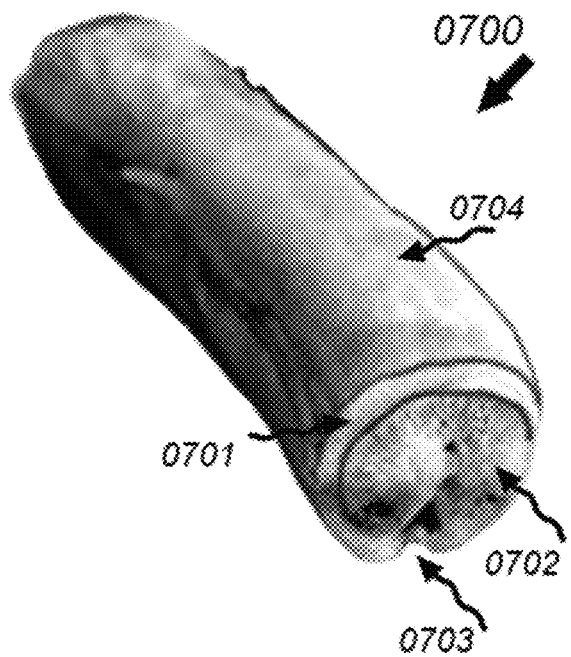
FIG. 7 is a prior art, a top plan view of a segment of fresh pizzle.

2. FIG. 7 (Prior Art) is a segment of a fresh pizzle. 0703 refers to a groove longitudinally along the whole pizzle. 0701 is muscle of the pizzle, serving as an outer layer for the whole pizzle piece distinguished from the inner member 0702. 0704 is the surface of the pizzle. 0702 includes tissues of corpus cavernosum, spongiosum, urethra, etc.

Figure 8:
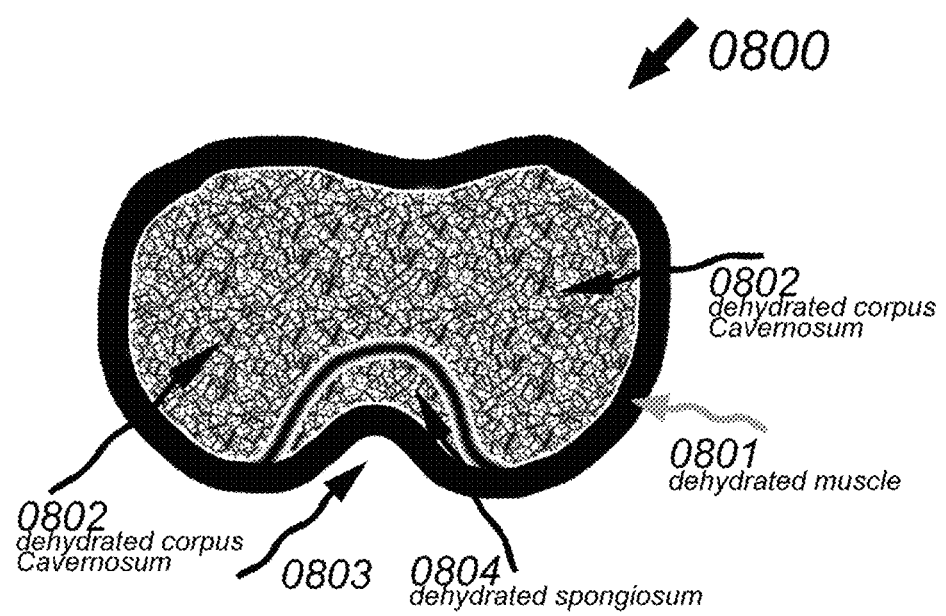
FIG. 8 is a prior art, a cross section view of a final product of traditional bully stick after dehydrating process.

3. Have the pizzle dehydrated by means of for example solar drying, heating or freeze drying. FIG. 8 (Prior Art) is a cross section figure for a final bully stick product after dehydrating process. This cross section is in a typical outline shape similar to capital letter "B". 0801 is dehydrated muscle in hard quality. 0802 is dehydrated corpus cavernosum. 0803 refers to a groove longitudinally along the pizzle. 0804 is dehydrated spongiosum.

Figure 9:
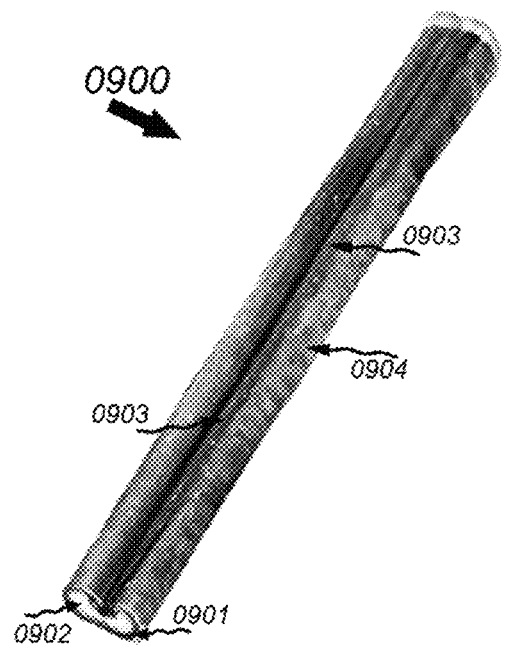
FIG. 9 is a prior art, a top plan view of a final product of a dehydrated bully stick with a typical cross section outline shape resembling capital letter "B".

4. FIG. 9 (Prior Art) is a final product, a dehydrated bully stick with a typical cross section outline shape similar to capital letter "B". 0901 and 0904 is a hard outer layer of the bully stick made of dehydrated muscle. 0902 is an inner member including tissues of corpus cavernosum, spongiosum, urethra, etc. 0903 refers to a groove longitudinally along the whole bully sticks body on its surface.

Figure 11:
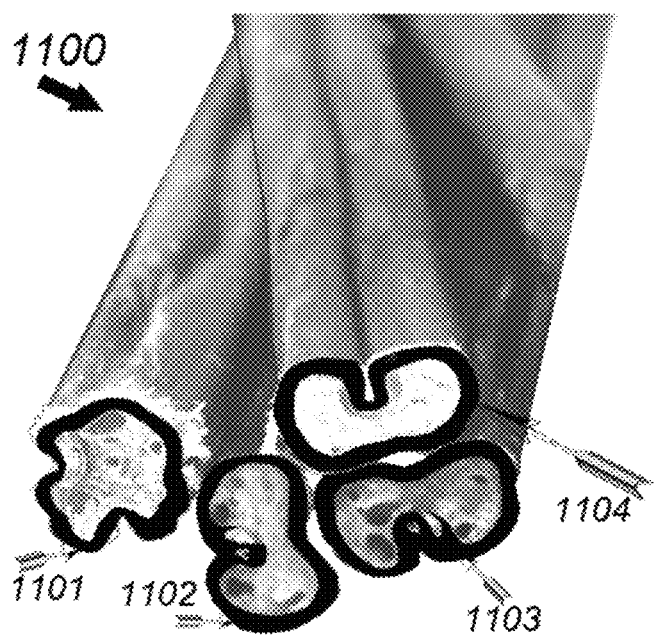
FIG. 11 is a prior art, a top plan view of a group of traditional bully stick products with various cross section outline shapes.

5. 1101, 1102, 1103 and 1104 in FIG. 11 (Prior Art) reflect a group of various cross section outline shapes that a traditional bully stick may have. Also 1201 to 1207 in FIG. 12 (Prior Art) reflect another group of various cross section outline shapes that a traditional bully stick may have.

6. The typical outstanding features (including structure features) of a Natural Bully Stick product may be derived from and determined by the aforementioned natural features of a natural bovine penis. It is disclosed by the present inventor that, a typical traditional bully stick product has its essential typical features as follows (from A to K):

A. An inherent groove appears longitudinally along the whole Bully Sticks body. The Products in FIGS. 8 and 9 reflect this feature. This structural feature (groove) is a common one to most typical bully sticks products. (Arriving at identifying this common feature requires careful observations. There are various shapes/structures/appearance that bull stick products possess, which makes it hard to identify a common structural feature. The present applicant surprisingly discloses that, "groove" is a key feature that most typical bully sticks products possess although they have various shapes/structures and various cross section shapes. This disclosure discloses a perfect imitation method to imitate or approximate traditional bully stick appearance.)

B. Cross section of traditional bully stick presents characteristic outline shapes. A typical outline is in a shape similar to capital letter "B", peanut (peanut icon), cashew nut (cashew nut icon), Arabic numeral "8", or heart icon. These typical outline shapes have a common feature that they have a "trough" area that is significantly lower than the surface. The "troughs" appearing on the outline shapes are created by aforementioned "groove" that runs longitudinally along the bully stick body. The items illustrated in FIG. 8 (Prior Art) and 9 (Prior Art) reflect this feature. Some other outline shapes are described in FIG. 11 (Prior Art) and 12 (Prior Art). These outline shapes are created by inherent feature of natural pizzle.

C. It is inherently a stick shape product. And in some other bully stick products, it is initially in a stick shape and is finally manipulated to a desired shape such as Knot, Spiral or Braid different from the initial stick shape.

D. Bully stick has animal pizzle ingredient, which is a very strong flavor product enjoying an irresistible attraction to dogs. Animal pizzle ingredient offers "inherently good palatability" for the pet chew.

E. Bully stick may include an outer layer and an inner member, where the former holds the latter by surrounding it. This structure is derived from pizzle inherent structure. The outer layer is formed by muscle and inner member formed by tissues of corpus cavernosum, spongiosum, urethra, etc. Products in FIG. 8 (Prior Art) and 9 (Prior Art) reflect this pet chew structure.

F. After being dehydrated, inherently, the outer layer of Bully Stick formed by muscle enjoys a property of getting hard. The hardness ideally accommodates dog's chewing desire, making it an ideal pet chew product. Traditional bully stick makes itself outstanding with extraordinary durability or hardness.

G. Typical properties of the outer layer include: being translucent (semi-transparent) in the whole outer layer or in a portion of the outer layer, and with fiber-like texture. (These two properties of outer layer are created by the nature of the muscle that forms the outer layer)

H. Typical range of thickness of the outer layer is 0.3 mm-5 mm.

I. Typical properties of the inner member/portion include: spongy, comparatively more unconsolidated or looser in texture than the muscle outer layer/portion. For example FIGS. 8 and 9, product 0800/0900 has an inner member 0802/0902 which includes tissues of corpus cavernosum, spongiosum and urethra, which is unconsolidated. And there are some small bubbles/blisters spread substantially homogeneously to the inner member material. Refer to FIG. 8, 0802 from bully stick has a plurality of tiny bubbles. (these properties of inner member are created by the nature of corpus cavernosum and/or spongiosum tissues that exist in a pizzle)

J. Inner member/portion and outer layer/portion have different appearance in color and/or texture. Inner member/portion color is comparatively lighter than outer layer/portion color. Inner member/portion color is typically white or yellowing white. Outer layer/portion color is typically light brown, brown, dark brown, red brown or muscle color. For example 0902 from pet chew 0900 is in white color and 0901 is in light brown. Density of inner member is lighter than Bully Stick outer layer. For example 0902 is lighter than 0901 in density. (these properties of color recognition are created by the nature of a pizzle)

K. Pizzle flavor. Traditional bully stick has an inherent characteristic pizzle flavor, which greatly attracts dogs to chew. As a sort of meat-by-products material, pizzle has a naturally strong flavor as other meat-by-products do, attractant to dogs.

All prior arts are silent with an intention to well imitate traditional Bully Stick with a composition material replacing the natural animal pizzle products. All prior art are silent to create a pet chew with features of the following as a whole: it's an extruded (or molded, or injection molded) stick with meat/meat-by-products (typically animal pizzle) ingredient and plant ingredient, with cross section outline shape of capital letter "B", peanut icon, cashew nut icon, heart icon or "8" and with a continuous groove on the surface longitudinally through the length of the stick body.

It is also surprisingly disclosed by present inventor that, primary features of the present disclosure are to imitate the properties/features/structure of traditional Bully Stick aforementioned. It's disclosed by present inventor that, a pet chew product must necessarily bear at least one property/feature as described above (especially A, B and C), OR, the pet chew would fail to imitate traditional Bully Sticks.

Artificial Bully Stick (or Bully-Stick-LIKE, or bully stick analogue) Pet Chew of the present disclosure imitating genuine bully stick is now being disclosed to serve as an alternative to aforementioned traditional (GENUINE) Bully Sticks, with significantly lower product cost, imitating some necessary properties or features (at least including shape or appearance features) of a traditional Bully Stick. Artificial Bully Stick (bully stick analogue) Pet Chew disclosed by the present disclosure is well distinguished from traditional Bully Sticks, which is typically an extruded (or injection-moulding, cast moulding or compression moulding) stick product formed from a composition material with plant ingredient. As a contrast, traditional Bully Stick is substantially a single ingredient product primarily without being processed other than dehydrating process.

One advantage of the Artificial Bully Stick (bully stick analogue) pet chew of the present disclosure is its hugely cheaper material cost than traditional bully stick. The Artificial Bully Stick pet chew is extremely cheaper than traditional bully stick which is made of substantially 100% bovine pizzle. The latter could be 4 times of the price of the former. Due to the natural scarcity property with the source of natural bovine pizzle, raw materials (bovine pizzle) for producing traditional bully sticks are sold at an extremely high price, which results in the final products, traditional bully sticks, being sold to consumers at an extraordinarily high price. Another advantage is the easier acquisition of raw material versus traditional bully stick products. Producing traditional bully stick products requires huge volume of natural animal pizzle. In one embodiment, the Artificial Bully Stick (bully stick analogue) pet chew of the present disclosure is formed from a composition with meat-by-product ingredient (for example pizzle). For example the composition has 10% pizzle in formula (90% is non-pizzle ingredient which is extremely acquisition-easier material than pizzle), in which producing this product just requires one tenth of pizzle material to manufacture the same quantity of finished products versus traditional bully stick products. Preparing the composition materials for production of Artificial Bully Stick pet chew is much easier than that for production of traditional bully sticks.

Figure 1:
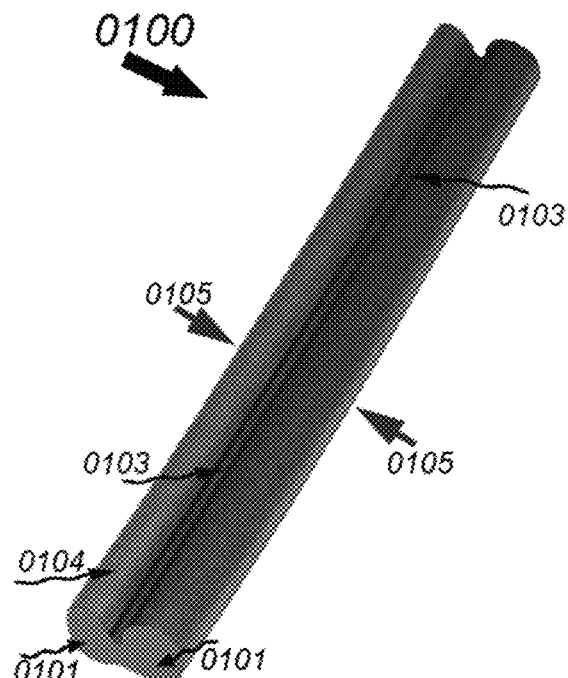
FIG. 1 is a top plan view of an Artificial Bully Stick (or say Bully-Stick-LIKE) pet chew according to the disclosure in a stick configuration formed from a single piece of material, with a cross section outline shape like capital letter "B".
Figure 14:
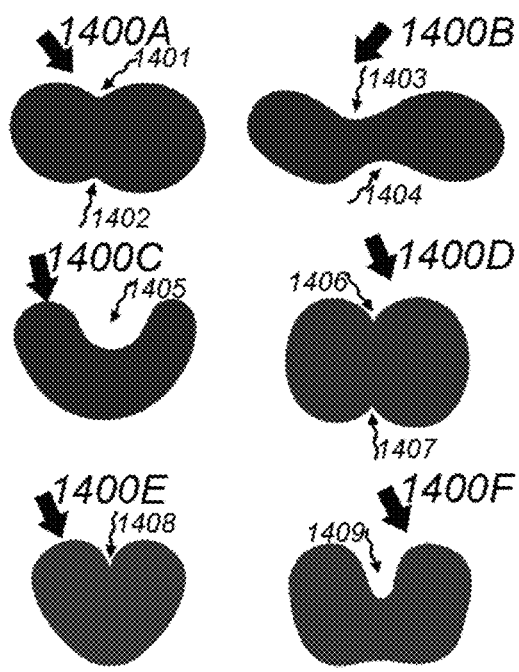
FIG. 14 shows six various alternative cross section outline shapes of a pet chew according to the disclosure.
Figure 15:
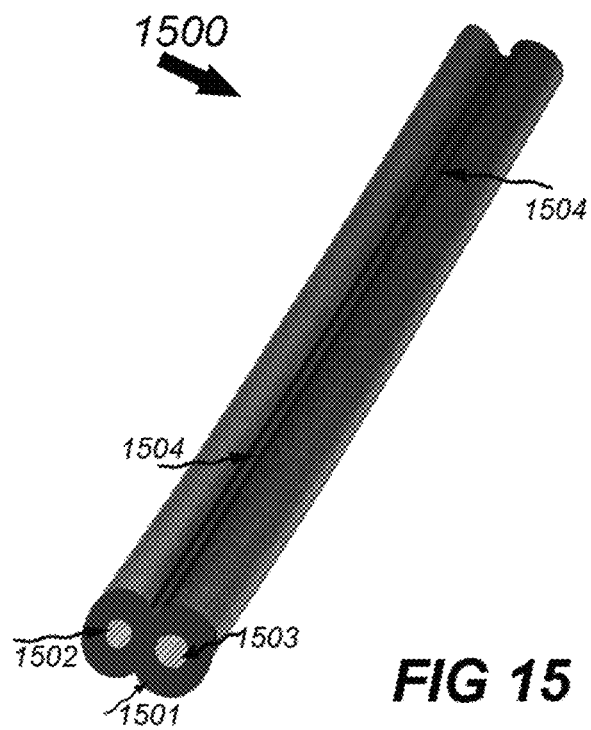
FIG. 15 is a top plan view of an Artificial Bully Stick (or say Bully Stick Analogue) pet chew according to the disclosure in a stick configuration formed from a single piece of material, with a cross section outline shape like Arabic Numeral "8", and with two hollow holes through the chew body.
Figure 17:
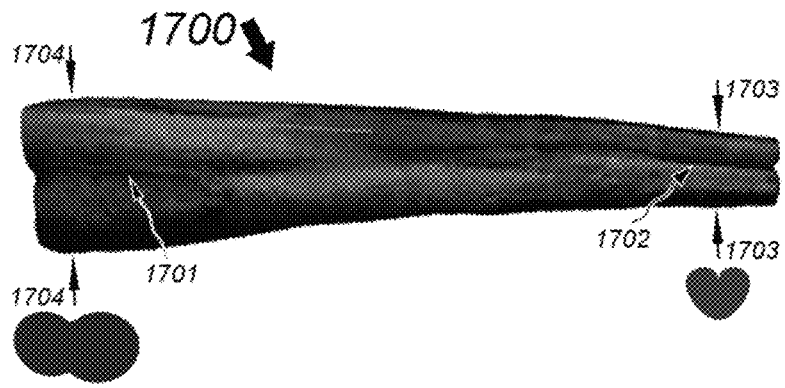
FIG. 17 is a top plan view of an Artificial Bully Stick (or say Bully Stick Analogue) pet chew according to the disclosure in stick configuration formed from a single piece of material, with one cross section outline shape similar to capital letter "B" and another similar to "heart icon", where the pet chew is formed by injection moulding process.

In some embodiments, the Artificial Bully Stick (or Bully-Stick-LIKE) member of the pet chew products of the present disclosure is in a form of a "single piece" of material (one-piece material). The single piece of material (or one-piece material) consists of or is made in a single undivided piece that may not have divided segments in it. For example it does not have outer layer member or inner member that is formed from two separate materials. As shown in FIG. 1, pet chew product 0100 in stick configuration refers to an embodiment of the present disclosure. 0100 is formed from a single piece of material. 0100 may be formed by injection molding, cast molding, compression molding or extrusion process. The cross section of 0100 at position 0105 is in a shape resembling capital letter "B" as illustrated in FIG. 14 (see 1400F), which is substantially identical to the shape of side 0101 on a longitudinal end of the chew stick. 0103 refers to a groove on the surface running longitudinally through the full length of the pet chew 0100. As illustrated in FIG. 17, pet chew product 1700 in stick configuration refers to an embodiment of the present disclosure, with one end thicker and the other thinner. 1700 is formed from a single piece of material. 1700 may be formed by injection molding, cast molding, compression molding. Extrusion process may not work for producing product 1700 because it generally merely results in a stick product with homogenous thickness through the full length. The cross section of 1700 at position 1703 is in a shape resembling a "heart icon" as illustrated therein, in compliance with 1400E from FIG. 14. The cross section of 1700 at position 1704 is in a shape resembling a peanut icon as illustrated therein, in compliance with 1400A from FIG. 14. 1702 and 1703 refer to two separate grooves running longitudinally along the length of the pet chew 1700. Alternatively, the Artificial Bully Stick member of the pet chew products of the present disclosure in a form of a "single piece" of material has a hole (hollow space in it) through the full length of it. This hole configuration appearing herein may provide some additional benefits such as: A, offering biting elasticity to the whole material; B, providing a space inside the chew to fill additional edible material in which may be attractant materials or flavoring enhancer materials. Natural bully stick products do not have these benefits due to the nature of their raw material inherently without such holes. Thus improvement is achieved by these artificial bully sticks. As shown in FIG. 15, pet chew product 1500 in stick configuration refers to an embodiment of the present disclosure with two holes running through the length of pet chew 1500 with two openings on both ends. 1500 is formed from a single piece of material. 1500 may be formed by injection molding, cast molding, compression molding or extrusion process. A cross section of pet chew 1500 is in a shape resembling Arabic numeral "8". 1504 refers to a groove on the surface running longitudinally through the full length of the pet chew 1500.

In comparison to other different materials to form a pet chew of the present disclosure, single piece of material may provide some benefits as following. A, Single piece of material may be easier to produce as it only requires one single material for production and potentially one single set of extrusion or injection moulding machine system. B, Thanks to the continuity of the material of the pet chew member made of a single piece of material, a greater structural strength of the material may be obtained. C, It may better accommodate injection moulding processing capability.

Figure 16:
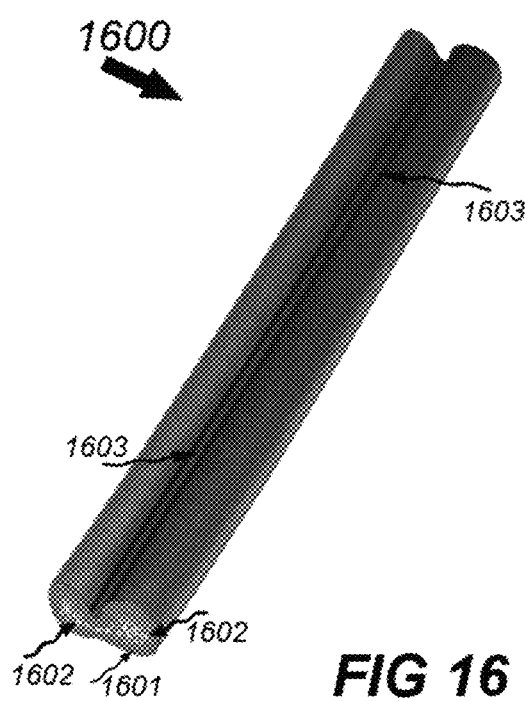
FIG. 16 is a top plan view of an Artificial Bully Stick (or say Bully Stick Analogue) pet chew according to the disclosure in stick configuration formed from a single piece of material, with a cross section outline shape similar to capital letter "B", and with numerous air bubbles spreading into the inside part of the single piece of material.

Alternatively, the single piece of material forming the pet chew products of the present disclosure has numerous (a plurality of) bubbles, blisters, or air-filled cavities spread into the interior of the material. The benefits of the air bubbles existing herein may include: increasing contract area with dog teeth which penetrate the exterior of the single piece of material, which provides improved tartar and dental plaque control actions; enhancing the imitation action by imitating the interior configurations or texture of a Genuine Bully Stick whose inside part is porous that is formed by tissues of corpus cavernosum and/or spongiosum; being more friendly to puppies or old dogs who have weak teeth while being gnawed. As shown in FIG. 16, pet chew product 1600 in stick configuration refers to an embodiment of the present disclosure. 1600 is formed from a single piece of material with bubbles inside the material. 1602 refers to the bubbles appearing at the interior of the material or the pet chew stick. 1601 refers to the exterior part of the material or the pet chew stick. Both the exterior part and the interior one are formed by a single piece of material. 1600 may be formed by injection molding or extrusion process. The outline of a cross section of 1600 is in a shape resembling capital letter "B" as illustrated in FIG. 14 (1400F), which is substantially identical to the shape of a side on one end of the chew stick 1600. 1603 refers to a groove running longitudinally through the full length of the pet chew 1600. The bubbles may be formed by applying vesicant or blowing agent to the material formula, where the material creates bubbles by injection molding or extrusion process and by the process of material releasing from high pressure area to low pressure area.

Figure 18:
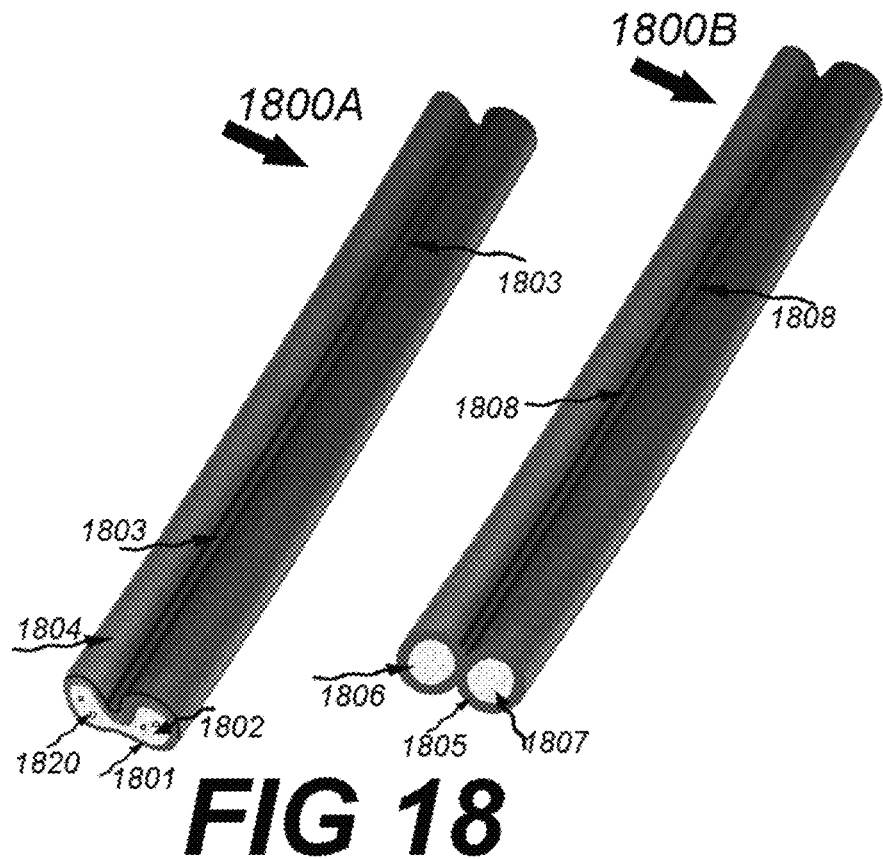
FIG. 18 is a top plan view of two pieces of Artificial Bully Stick (or say Bully-Stick-LIKE) pet chews in stick configuration having an outer layer segment and an inner segment, one of which has a cross section outline shape similar to capital letter "B" and the other, Arabic Numeral "8".
Figure 19:
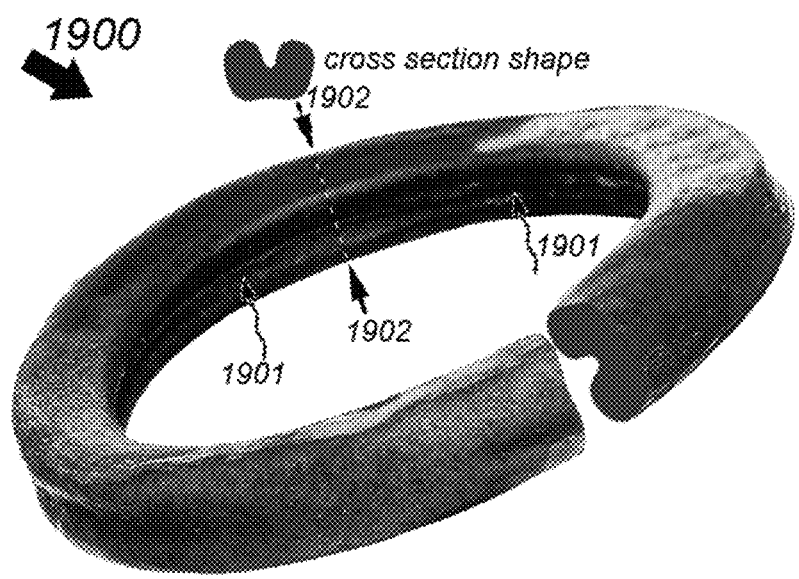
FIG. 19 is a top plan view of an Artificial Bully Stick (or say Bully-Stick-LIKE) pet chew according to the disclosure in a ring configuration formed from a single piece of material, with a cross section outline shape similar to capital letter "B".

Yet in some other embodiments, the Artificial Bully Stick (or Bully-Stick-LIKE) pet chew (or pet chew member) of the present disclosure includes an outer layer member/portion and an inner member/portion, where the former holds the latter by surrounding it, in a purpose to imitate a typical feature of traditional Bully Sticks. In one embodiment, the thickness of the outer layer is substantially homogenous along the whole stick body, as traditional bully stick does. Typical thickness of the outer layer is 0.3 mm-5 mm. As shown in FIG. 18, 1800A is an extruded pet chew with outer layer of 1801 and inner member of 1802. And 1800B is an extruded pet chew with outer layer of 1805 and inner members of 1806 and 1807. Typically, the outer layers 1801 and 1805 serve as an outer casing for the pet chews surrounding the inner members, together forming a stick shape product.

In one preferred embodiment, an Artificial Bully Stick (bully stick analogue) pet chew (or pet chew member) of the present disclosure has a (built-in) groove form longitudinally running along the pet chew stick body on the surface of the Artificial Bully Stick (member), with a purpose to imitate or approximate a typical inherent groove of traditional Bully Stick products. More typically, the groove is a continuous one longitudinally through the full length of the stick body appearing on the surface of the stick body. It should be noted that, there are various shapes/structures/appearance that genuine bull stick products may possess, which makes it hard to identify a common structural feature of them. The present applicant surprisingly discloses that, "groove" is a key feature that the Artificial Bully Sticks (bully stick analogue) products should possess to imitate/approximate genuine bully stick appearance although it is understood that genuine bully stick have various shapes/structures and various cross section shapes. This disclosure discloses a perfect and easy imitation method to imitate traditional bully stick appearance. Additionally, the form of "groove" appearing on the pet chew may provide extra benefits of tooth cleaning action, where the groove form may accommodate dog tooth configurations and have it slide along the two walls of the groove while being gnawed by a dog, and thus tartar or dental plaque may be mechanically removed hereby. A typical groove depth of the Artificial Bully Stick is at least 1 mm as that of a genuine bully stick does. Typically the depth of a groove of the Artificial Bully Stick accounts for at least 10% of the thickness of the Artificial Bully Stick. A depth accounting for "10% of the thickness" may be the least one that makes a groove noticeable to consumers when it appears on a chew stick surface. Now refer to FIG. 1, 0100 is an extruded pet chew with 0103, a groove along the stick body imitates natural Bully Sticks, which is formed by an extruder die with pre-designed shape forming a groove in an extruding process. As shown in FIG. 14, 1401 to 1409 refer to nine "trough" areas that refer to 9 troughs (grooves) in the six different cross section shapes of pet chews according to the present disclosure. 1504 from FIG. 15, 1603 from FIGS. 16, 1803 and 1808 from FIGS. 18 and 1901 from FIG. 19 refer to a groove form existing in the pet chews according to the present disclosure, where the grooves are continuous ones longitudinally through the whole length of the stick bodies. 1701 and 1702 from FIG. 17 also refer to a groove existing on the surface of the pet chew sticks, but as a contrast, 1701 and 1702 are not continuous ones, each one of which runs at a partial length of the stick chew product 1700.

Cross section outline shapes of Artificial Bully Stick (bully stick analogue) pet chews of the present disclosure may resemble the cross section outline shapes of natural Bully Sticks, with a purpose to imitate or approximate Bully Sticks. Natural bully sticks have various cross section outline shapes which are inherently determined by raw material of pizzles. In one embodiment, cross section of an Artificial Bully Stick pet chew (artificial-bully-stick member) of the present disclosure is in an outline shape substantially similar to capital letter "B", or cashew nut (icon), or peanut (icon), or heart icon, or Arabic numeral "8", imitating/approximating a typical cross section outline shape of traditional bully sticks as aforementioned. These typical outline shapes of the Artificial Bully Stick (shapes that are similar to capital letter "B", or cashew nut (icon), or peanut (icon), or heart icon, or Arabic numeral "8") have a common feature, where the outline shapes have a "trough" area that is significantly lower than the surface. The "trough" appearing on the outline shapes are created by aforementioned "groove" that runs longitudinally along the Artificial Bully Stick body. These specific cross section outline shapes (shapes that are similar to capital letter "B", or cashew nut (icon), or peanut (icon), or heart icon, or Arabic numeral "8") with distinct "trough" part may well fulfill the natural bully stick imitation purposes. As shown in FIG. 14, 1400A, 1400B, 1400C, 1400D, 1400E and 1400F illustrate six alternative cross section outline shapes of pet chews according to the present disclosure. The shape of 1400A and 1400B both are similar to a peanut icon. And the shapes of 1400C, 1400D, 1400E and 1400F resemble cashew nut icon, Arabic numeral "8", heart icon and capital letter "B" respectively. The cross section shapes of the artificial bully sticks as illustrated in FIGS. 1, 2, 4, 5, 16 and 18 (1800A) resemble a capital letter "B". The cross section shapes from FIG. 15 and FIG. 18 (1800B) resemble an Arabic numeral "8". The cross section shape (1902) from FIG. 19 resembles capital letter "B". The cross section shapes at two different positions of the pet chew stick from FIG. 17 resemble a peanut icon and a heart icon respectively. As shown in FIG. 1, 0100 is an extruded pet chew with a typical cross section outline shape similar to capital letter "B" corresponding to the cross section outline shape 1400F from FIG. 14, with a purpose to imitate a typical cross section outline shape of traditional bully sticks. And in some other alternative embodiments, the cross section outline shape of pet chew 0100 from FIG. 1 may be replaced by other desired shapes such as 1400A, 1400B, 1400C, 1400D and 1400E as illustrated in FIG. 14. Alternatively in some other embodiments, the cross section outline shape of 1800A and 1800B from FIG. 18 may be replaced by the shapes such as 1400A, 1400B, 1400C and 1400E as illustrated in FIG. 14 according to desire.

Figure 12:
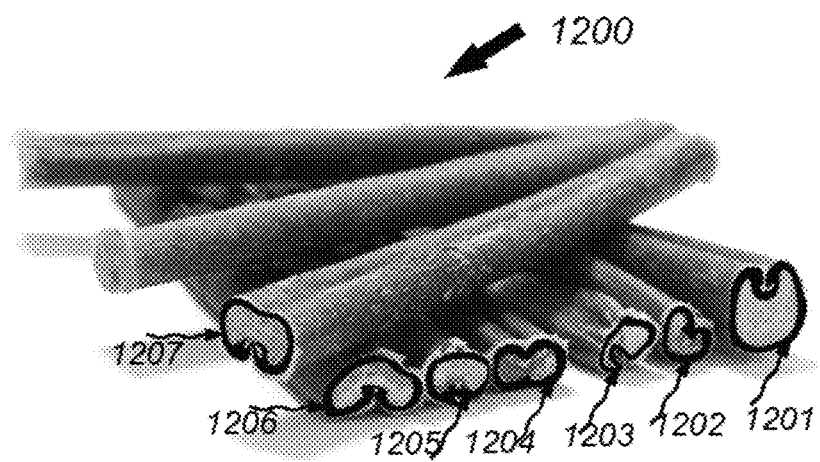
FIG. 12 is a prior art, a top plan view of another group of traditional bully stick products with various cross section outline shapes

Some other alternative cross section outline shapes for the Artificial Bully Stick (or Bully-Stick-LIKE) pet chew can refer to the various ones that traditional bully stick may feature with as described in FIGS. 11 and 12.

In one embodiment, inner member color of the Artificial Bully Stick (or Bully-Stick-LIKE) pet chew is comparatively lighter than outer layer color, as GENUINE bully stick does. Now refer to FIG. 18, 1800A is an extruded pet chew with inner member of 1802 is lighter than outer layer 1801 in color. Inner member color is typically white or yellowing white. Outer layer color is typically light brown, brown, dark brown, red brown or muscle color.

In one embodiment, a whole or a part of the outer layer of the Artificial Bully Stick (or Bully-Stick-LIKE) pet chew stick of the present disclosure is translucent where inner member inside is a bit visible through the outer layer, in a purpose to imitate a typical outer layer appearance of traditional Bully Sticks. While observing genuine bully stick product, it's concluded that a pet chew stick with a completely transparent/clear outer layer or with a completely opaque outer layer is thought to fail to well imitate the appearance of genuine bully stick. Now refer to FIG. 18, the area 1804 is a one where inner member inside is a bit visible through it.

It should be noted that, all prior arts are silent to create a pet chew with features of the following as a whole: it's an artificial bully stick, it's an extruded stick (or molded, or injection molding) formed from a composition material with plant ingredient, with cross section outline shape of "B", or peanut icon, or cashew nut icon, or heart icon, or "8", and with a groove longitudinally running through the whole length of the stick body.

And in one embodiment, the outer layer of a Bully Stick Analogue according to the present disclosure presents fiber-like texture, in a purpose to imitate a typical outer layer texture of traditional Bully Sticks. The thickness of outer layer of the Artificial Bully Stick of the present disclosure is typically 0.3 mm-5 mm, imitating the thickness feature of traditional bully stick products.

In one embodiment, inner member of the Artificial Bully Stick pet chew of the present disclosure has a bubble, blister or air-filled cavity (numerous bubbles, blisters or air filled cavities), being intended to imitate/approximate the appearance/texture of inner part of traditional bully stick that is formed by tissues of corpus cavernosum and/or spongiosum. Alternatively, there are edible-granule-formed materials appearing in the inner member (creating visual illusion of pore-like forms), being intended to visually imitate appearance/texture of inner part of traditional bully stick that is formed by tissues of corpus cavernosum and/or spongiosum. In one embodiment, these tiny bubbles or edible-granule-formed materials spread substantially homogeneously to the inner member material. As shown in FIG. 18, 1800A is an extruded pet chew, whose inner member 1802 may further include air bubbles or edible-granule-formed materials, such as 1820, spread into the inner member. In one embodiment, inner member of the Artificial Bully Stick pet chew of the present disclosure is comparatively more unconsolidated or looser in texture than the outer layer. As shown in FIG. 18, 1800B is an extruded pet chew with inner members 1806 and 1807 comparatively looser than out layer 1805.

In one embodiment, the Artificial Bully Stick (or Bully-Stick-LIKE) pet chew includes artificial pizzle flavor (or say bully stick flavor) or hydrolyzed pizzle ingredient (this can also provide strong pizzle flavor) in its formula, which further enhances its attraction to dogs and consumers.

In some embodiments of the present disclosure, the outer layer hardness of the Artificial Bully Stick pet chew is with a durometer value between 80 and 100. In other embodiments of the present disclosure, the outer layer hardness of the edible pet chew is with a durometer value between 60 and 80. In other embodiments of the present disclosure, the outer layer hardness of the edible pet chew is with a durometer value between 50 and 60. In other embodiments of the present disclosure, the outer layer hardness of the edible pet chew is with a durometer value between 40 and 50.

In some embodiments of the present disclosure, the Bully Stick Analogue pet chews are formed from a single piece of material having air bubbles inside the chew stick. The Bully Stick Analogue as illustrated in FIG. 16 is an exemplary embodiment with outer portion 1601 and inner portion 1602. In the embodiments, the hardness of the outer portion of the Artificial Bully Stick pet chew is with a durometer value between 80 and 100. In other embodiments of the present disclosure, the hardness of the outer portion is with a durometer value between 60 and 80. In other embodiments of the present disclosure, the hardness of the outer portion is with a durometer value between 50 and 60. In other embodiments of the present disclosure, the hardness of the outer portion is with a durometer value between 40 and 50.

Now to disclose formulas that may alternatively form the Artificial Bully Stick (or Bully-Stick-LIKE) pet chew (or pet chew member).

Firstly the phrase of "on an as formulated basis" in the present disclosure that may be used in following paragraphs is defined here. It is about a means to determine weight percentages of an ingredient in a product. "On an as formulated basis" is also a method that currently FDA (or AAFCO) organizations of USA usually utilize to determine weight percentage for an ingredient in a product. By the means of "on an as formulated basis", the weight percentage of an ingredient in a food is determined as it is added in the formulation of the food, including its inherent water content, not counting the water added for processing. All weight percentage values of ingredients appearing in the present disclosure apply this "on an as formulated basis" rule.

In one embodiment, the formula of the Artificial Bully Stick (or bully stick analogue) pet chew (or pet chew member) of the present disclosure includes a specific meat by-products, pizzle (or animal penis) ingredient. The term of "pizzle ingredient" or "pizzle material" that works as an ingredient to form an composition material forming the artificial bully stick refers to an material derived from animal pizzle, which may be in a form of fresh pizzle, dehydrated pizzle, dried pizzle, ground pizzle, ground dehydrated pizzle, enzymatic pizzle or hydrolyzed pizzle. The advantages of including this specific meat by-products, pizzle ingredient, in the formula go as follows (from point 1 to 4):

1. This product is an extruded (or molded, or injection molding) Artificial Bully Stick pet chew with composition materials intended to imitate the properties of traditional bully stick products. A formula with pizzle will make the pet chew not only with a traditional bully stick appearance, but also with real bully stick ingredients, where product formula feature is in conformity with product appearance. Selling points of finished products are enhanced by the conformity.
2. Another advantage of applying pizzle ingredient to the Artificial Bully Stick pet chew formula is that, it provides a perfect means to make full use of pizzle leftovers created from genuine bully stick manufacturing industry. A marketable genuine bully stick need be fairly long, for example at least longer than 4". A bully stick product less than for example 4" has a jeopardy of dog choking. Most popular bully stick length welcome by consumers is 6" and 12". Producing 6"/12" bully sticks by cutting a pizzle with initial length to desired length certainly generate a lot of small sized pizzle segments. These segments were purchased with a full price but manufacturers did not come up with a method to make good use of them. The Artificial Bully Stick pet chew of the present disclosure can well make use of the pizzle segments by for example grinding them to small piece and having them added to its composition formula.
3. Yet another advantage of applying pizzle ingredient to the Artificial Bully Stick pet chew formula is that, the pizzle ingredient can provide natural pizzle flavor to the pet chew without adding artificial flavors. Natural pizzle flavor is thought to be healthier element than artificial pizzle flavor.
4. Pizzle ingredient is a natural premium protein source for a pet chew product.

In one embodiment, the Artificial Bully Stick (or bully stick analogue) pet chew of the present disclosure includes at least 3% pizzle (or animal penis) ingredient in formula. The reason why it has to be with "at least 3%" pizzle ingredients goes as follows (point 1 and 2):

1. "At least 3% pizzle" provides basic inherent attractant attracting dogs to chew on. Per palatability tests conducted by present inventor, this Artificial Bully Stick pet chew with less than 3% cannot provide basic inherent attraction to dogs without aid of other attractant ingredient. "At least 3% pizzle" offering "start point" palatability. We conducted palatability contrast tests to determine the smallest percentage of pizzle ingredient to put into the Artificial Bully Stick pet chew. The test interprets that when the pizzle percentage goes up to 3% or larger than 3%, a jump of number of preference appears versus plain extruded (or molded, or injection molding) stick chews w/o pizzle ingredient. And the preference is consistent when the pizzle percentage stays at 3% to 10%. Therefore 3% is determined to be the minimum pizzle percentage in the Artificial Bully Stick pet chew.

2. At least 3% pizzle in formula enables product labeling to claim "with pizzle", or "with real pizzle", or "with bully stick ingredient" or "with real bully stick" on consumer packages, enhancing product selling points to consumers. A product with less than 3% pizzle cannot indicate "with pizzle" on package labels legally. This is a favorable advantage for the Artificial Bully Stick pet chew product to indicate "with pizzle" as a part of product name which makes the product attractive to consumers (remarks: if the ingredient goes to at least 25%, it will be applied with "dinner" rule in labeling). According to labeling model regulations by AAFCO (the Association of American Feed Control Officials), an ingredient cannot appear as a part of product name or be highlighted on the principal display panel if the ingredient accounts for less than 3% in product formula on an as formulated basis.

In some embodiments, the Artificial Bully Stick (or bully stick analogue) pet chew (or pet chew member) includes 3%-50% pizzle ingredient.

In some embodiments, the Artificial Bully Stick (or bully stick analogue) pet chew (or pet chew member) includes 5%-65% (more typically 10%-25%) pizzle ingredient on an as formula basis in its formula. The Bully-Stick-LIKE pet chew (or pet chew member) with over 50% (especially over 65%) pizzle ingredient is considered too expensive, which could violate the initial intention of introducing this product. Also The Artificial Bully Stick pet chew (or pet chew member) with over 50% (especially over 65%) pizzle ingredient is considered to be able to ruin the "durability" of the pet chew. The reason is, the more an extruded (or molded, or injection molding) pet chew contains meat (meat byproduct), the less durability the extruded (or molded, or injection molding) pet chew will be with. Pizzle is an animal source meat-by-product-ingredient. According to R&D findings by the inventor, 10%-25% pizzle ingredient in the Artificial Bully Stick pet chew (or pet chew member) is an optimized one, which provides a balance between durability, material cost, sufficient inherent natural pizzle flavor and natural protein source.

We conducted palatability contrast tests to determine the starting percentage of pizzle ingredient to put into the Artificial Bully Stick pet chew that can secure an absolute preference for dogs for the pet chew. The test interprets that when the pizzle percentage goes up to 10% or larger than 10%, an absolute preference appears versus plain extruded (or molded, or injection molding) stick chews w/o pizzle ingredient. On the other hand, the more pizzle in a pet chew, the more expensive the pet chew will be. 10%-25% is one pizzle percentage range in the Artificial Bully Stick pet chew that can provide a balance between "palatability" and cost.

In one embodiment, the Artificial Bully Stick (or Bully-Stick-LIKE) pet chew of the present disclosure includes a plant ingredient in the formula. This Artificial Bully Stick pet chew product is an extruded (or injection-moulding, or cast moulding, or compression moulding) product. Plant ingredient is an often-used material for extruded (or injection-moulding, or cast moulding, or compression moulding) products with advantages of (point 1, 2, 3 and 4):

1. Significantly lower cost than animal ingredients.
2. Provides vegetable nutrition offering a nutrition balance and a healthy diet.
3. Facilitates to make the Artificial Bully Stick pet chew with ideal durability/hardness which enables it to imitate this essential property of traditional bully sticks. Plants especially plant starch is a good material for extruded (or molded, or injection molding) products which can facilitate the achievement of ideal durability/hardness especially in an extruding (or injection molding) process. A theory explains how it works: When the starch part of plant material is cooked or heated at a particular temperature in extruder or injection molding machine (the temperature is generally >40° C. and what the particular temperature depends on the nature of various types of the starch), heat causes the crystalline regions of the starch to become diffuse, so that the chains begin to separate into an amorphous form. The intermolecular bonds of starch molecules begin to break down. Starch dissolves in water to a sort of paste status. Thus gelatinization occurs in the starch which offers the durability/hardness property for the pet chew.
4. Can materially imitate a desirable "translucent" outer layer of the Artificial Bully Stick which is a property of traditional (GENUINE) Bully Stick.

A typical material working as a plant ingredient is plant starch, such as (but not limited to) corn starch, sweet potato, sweet potato starch, tapioca starch and potato starch.

In one preferred embodiment, the Artificial Bully Stick includes at least 20% (for example 20%-90% plant, more typically 20%-50%) plant ingredient in weight on an as formulated basis.

It should be noted that the "plant" ingredient in the present disclosure refers to all edible plant materials and edible-plant-derived materials, such as (but not limited to) vegetables, fruit, edible-plant-derived materials, vegetable-derived materials, fruit-derived materials, plant protein, vegetable protein, plant starch, vegetable starch, grains, cereals, corn, gluten-free edible plant and gluten-free vegetables. Gluten-free plant and gluten-free vegetables are materials to form the "plant ingredient" since gluten materials are considered by experts in this industry as the ones that could potentially make dogs allergic. Examples of gluten-free plant material are tapioca, soybean, sweet potato, potato and carrot.

The reasons why it is optimal to be larger than 20% (20% specifically) plant ingredient in the Artificial Bully Stick go as follows: 1. According to our outstanding research tests, 20% plant ingredient appearing in the Artificial Bully Stick formula is the least one that can successfully facilitate recipe to make the Artificial Bully Stick product with ideal durability/hardness which enables it to imitate this essential property of traditional bully sticks. 2. Recipe with less than 20% plant ingredient fails to do that way with unsatisfactory durability product.

The reasons why the plant ingredient existing in the formula of the Artificial Bully Stick may be "<50% plant ingredients" go as follows:

Since dogs are carnivorous, plant material does not attract pets very much. A pet chew product with too high plant percentage (over 50%) existing in the formula is less attractive to dogs, since dogs do not prefer vegetal material. Our tests indicate that, in an extruded (or injection-moulding, or cast moulding, or compression moulding) pet chew product, <50% plant ingredient by weight can achieve a good malleability and durability for an extruded piece (or injection molding formed piece). Too much plant ingredients in it will reduce the palatability or attraction of the pet chew significantly. Our tests indicate that, in a pet chew product, when plant ingredient being >50% by weight, plant ingredient will be an absolutely primary ingredient, which makes the pet chew NOT good in palatability performance and not attractive to dogs. Therefore, in a pet chew product, ">50% plant ingredient" may not be optimal to form the extruded (or injection-moulding, or cast moulding, or compression moulding) pet chew of the present disclosure.

In one embodiment, the Artificial Bully Stick (or Bully-Stick-LIKE) pet chew stick is typically with a length of about 6" or 12", which is considered as most popular stick length welcome by consumers. Diameter of the chew stick could be 1 cm to 5 cm.

In one embodiment, the Artificial Bully Stick (or Bully-Stick-LIKE) pet chew member includes an animal ingredient (including meat and meat by-products) ingredient in the formula.

It should be noted that the "meat" ingredient in the present disclosure is defined as the material selected from (but not limited to) the group consisting of: animal flesh, animal muscle, poultry meat, chicken, chicken breast, duck, goose, turkey, venison, porcine meat, pork, bovine meat, beef, mutton, lamb, goat meat, fish, meat meal, chicken meal, fish meal, hydrolyzed meat protein, hydrolyzed animal material, hydrolyzed animal protein, meat derived ingredient and poultry derived ingredient.

It should also be noted that the "meat by-product" ingredient in the present disclosure is defined as the material typically selected from (but not limited to) the group consisting of: animal pizzle, porcine meat by-product, poultry by-product, bovine meat by-product, animal viscera, animal stomach, animal tongue, animal kidney, animal blood, animal bone, partially defatted low temperature fatty tissue, animal intestines, animal spleen, animal liver, animal lung, animal heart, animal pizzle, meat by-product meal, poultry by-product meal, hydrolyzed meat-by-products protein, hydrolyzed meat-by-products material, meat by-product derived ingredient, poultry by-product derived ingredient, animal fat and animal oil. It should be noted that the "meat by-product" in the present disclosure does not include animal hide/skin material and collagen material with the reasons of: A, both animal hide/skin material and collagen do not have attractive flavor urging dogs to chew. B, manufacture of animal hide and collagen is relatively unregulated industry. It may create pollution to environment. $H_2O_2$ and NaOH chemicals that are used for rawhide manufacture and heavy metals may remain in finished products which harm dogs' health.

Animal ingredient (including Meat and Meat By-products) is an often-used material for extruded (or injection-moulding, or cast moulding, or compression moulding) products with advantages of (point 1 and 2). "Animal ingredient" is defined as edible materials derived from slaughtered mammals. It includes (but not limited to) meat, meat by-products. It does not include hair, horns, teeth and hoofs.
1. Inherent good palatability. Dogs are carnivorous, which have an inherent appetite to eat meat (meat by-product) food. Meat (meat by-product) ingredients in a pet chew works as an attractant providing inherent good palatability for the pet chew.
2. Nutrition. Meat (meat by-product) as a perfect source of animal protein, offering a good nutrition to dogs.

In some embodiments, the Artificial Bully Stick (or Bully-Stick-LIKE) pet chew (or pet chew member) includes 3%-80% (typically 10%-50%) animal ingredient (meat ingredient and/or meat by-products) in its formula on an as formula basis.

The reason why it has to be with "at least 3% animal ingredient" goes as follows (point 1 and 2 below):
1. "At least 3% meat (or meat by-product)" provides basic inherent attractant attracting dogs to chew on. Per palatability tests conducted by present inventor, this Artificial Bully Stick pet chew with less than 3% cannot provide basic inherent attraction to dogs without aid of other attractant ingredient. "At least 3% meat (meat by-product)" offering "start point" palatability.
2. At least 3% meat (meat by-product) in formula enables product labeling to claim "with meat (meat by-product)" or "with real meat (meat by-product)" on consumer packages, enhancing product selling points to consumers. A product with less than 3% meat (meat by-product) cannot indicate "with meat (meat by-product)" on package labels legally. This is a favorable advantage for the Artificial Bully Stick pet chew product to indicate "with meat (meat by-product)" as a part of product name which makes the product attractive to consumers (remarks: if the ingredient goes to at least 25%, it will be applied with "dinner" rule in labeling). According to labeling model regulations by AAFCO (the Association of American Feed Control Officials), an ingredient cannot appear as a part of product name or be highlighted on the principal display panel if the ingredient accounts for less than 3% in product formula on an as formulated basis.

In one embodiment, in addition to animal ingredient, the Artificial Bully Stick (or Bully-Stick-LIKE) pet chew further includes a chemical in formula. The chemical is introduced to provide the Artificial Bully Stick pet chew sufficient rigidity/durability and strength in finished product. The chemical is selected from the group consisting of a thickener, a humectant, a stabilizer, an emulsifier, a gelatinizer, a binder, and a filler.

The thickener is selected from the group consisting of: glucose syrup, malt syrup, soy protein Isolate, wheat protein isolate, corn protein isolate, *artemisia* gum, linseed gum, deacetylated chitin, pectins, sodium alginate, xanthan gum, carrageenan; phosphated distarch phosphate, sodium lactate, diacetyl tartaric acid ester of mono(di)glycerides(DATAE), *sesbania* gum, polyglycerol esters of fatty acid (polyglycerol monostearate, polyglycerol monooleate), maltitol, sorbitol, propylene glycol, ablmoschus *manihot* gum, β-cyclodextrin, arabic gum, starch acetate, guar gum, potassium alginate, carob bean gum, gellan gum, sodium polyacrylate, distarch phosphate, gelatin, hydroxypropyl, distarch phosphate, hydroxypropyl methyl cellulose, agar, acid treated starch, sodium carboxy methyl cellulose, oxidized starch and oxidized hydroxypropyl starch.

The humectant is selected from the group consisting of: soy protein Isolate, wheat protein isolate, corn protein isolate, glucose syrup, malt syrup, sodium pyrophosphate, trisodium orthophosphate, sodium hexametaphosphate, sodium tripolyphosphate, phosphoric acid, calcium dihydrogen phosphate, sodium lactate, maltitol, sorbitol, propylene glycol, glycerin, sodium dihydrogen phosphate, sodium phosphate dibasic, potassium lactate, sodium lactate, acetylated distarch phosphate and acetylated distarch adipate.

The stabilizer is selected from the group consisting of: trisodium orthophosphate, potassium sorbate, sodium stearoyl lactylate, calcium stearoyl lactylate, phosphoric acid, hydroxypropyl starch, pectins, xanthan gum, carrageenan, sodium lactate, polyglycerol esters of fatty acid (polyglycerol monostearate, polyglycerol monooleate), maltitol, sorbitol, propylene glycol, propylene glycol esters of fatty acid and glucono delta-lactone.

The emulsifier is selected from the group consisting of: soy protein Isolate, wheat protein isolate, corn protein isolate, Sucrose esters of fatty acid, sodium hexametaphosphate, sodium stearoyl lactylate, calcium stearoyl lactylate, hydroxypropyl starch, pectins, carrageenan, diacetyl tartaric acid ester of mono(di)glycerides (DATAE), polyglycerol esters of fatty acid (polyglycerol monostearate, polyglycerol monooleate), maltitol, sorbitan monolaurate, sorbitol, propylene glycol, propylene glycol esters of fatty acid, polyoxyethylene xylitan monostearate, tripolyglyceryl monostearate, potassium stearate, mono-(di-,tri-)glyce rides of fatty acids, modified soybean phospholipid, sodium caseinate, citric and fatty acid esters of glycerol, lactic and fatty acid esters of glycerol, sodium starch octenyl succinate and acetylated monoand diglyceride (acetic and fatty acid esters of glycerol).

The gelatinizer is selected from the group consisting of: soy protein Isolate, wheat protein isolate, corn protein isolate, propylene glycol, glucono delta-lactone.

The binder is selected from the group consisting of: glutinous rice flour, gelatin, linseed gum, pectins, xanthan gum, carrageenan, *sesbania* gum, maltitol, sodium alginate, ablmoschus *manihot* gum, arabic gum, guar gum, Carob bean gum, gellan gum and agar.

The filler is selected from the group consisting of: a plant material, a plant derived material, a plant protein and a plant starch, saccharide, dextrin, lactose, mineral salt and fructose.

In some embodiments, the Artificial Bully Stick (or Bully-Stick-LIKE, or bully stick analogue) pet chew of the present disclosure is free of animal hide/skin materials and/or free of collagen materials with the concerns of drawbacks of animal hide/skin and collagen mentioned in previous paragraph.

In some embodiments to form a composition for making the Artificial Bully Stick (or Bully-Stick-LIKE) pet chew, in addition to animal ingredient, animal hide material is used. A small percentage of animal hide (for example <20%) may help strengthen the durability of the pet chew stick. But due to the disadvantages of animal hide material as mentioned in above Paragraphs, animal hide material to be used to form the composition is required to be at a limited percentage by weight. It's anticipated that when animal hide percentage in the composition goes higher than 50%, animal hide material will be an absolute majority ingredients existing in the pet chew formula, which makes the pet chew product an animal hide based product. A pet chew product made from animal hide based material is thought to significantly involve in an unhealthy product concern and environment harm concern. Therefore, in some embodiments where animal hide exists in the formula of the Artificial Bully Stick pet chew, it is optimal to have the animal hide material account for less than 50% in weight in its formula. More typically, animal hide material account for 5%-20% in weight in its formula.

In some embodiments of the present disclosure, the Artificial Bully Stick (or Bully-Stick-LIKE) pet chew of the present disclosure includes a plant ingredient (>20%) and an animal ingredient (typically meat or meat-by-products. remarks: meat-by-products includes pizzle) in the formula, forming a pet chew with a texture resembling that of traditional bully stick product. All prior arts fail to disclose that plant and animal ingredients with a proper content percentage existing in a composition material can enable the composition material extruded (or molded, or injection molding) sticks to obtain a finished product appearance/texture/rigidity resembling that of traditional bully stick product.

In some embodiments of the present disclosure, the Artificial Bully Stick (or Bully-Stick-LIKE) pet chew of the present disclosure includes a hydrolyzed animal protein ingredient and a plant ingredient (>20%) in the formula. The hydrolyzed animal protein (for example hydrolyzed meat protein) works as an attractant in the recipe.

In some embodiments of the present disclosure, the Artificial Bully Stick (or Bully-Stick-LIKE) pet chew of the present disclosure includes a pizzle ingredient and a plant ingredient (>20%) in the formula.

In some embodiments of the present disclosure, the Artificial Bully Stick (or Bully-Stick-LIKE) pet chew of the present disclosure includes a pizzle ingredient, a plant ingredient and a meat ingredient in the formula.

In yet some other embodiments of the present disclosure, the Artificial Bully Stick pet chew of the present disclosure includes a plant ingredient (>20%) and a meat by-products ingredient in the formula.

In an embodiment of the present disclosure, the Artificial Bully Stick (or Bully-Stick-LIKE) pet chew of the present disclosure includes 20%-50% plant ingredient, 10%-50% meat ingredient and a chemical.

In an embodiment of the present disclosure, the Artificial Bully Stick (or Bully-Stick-LIKE) pet chew of the present disclosure includes 0.3%-5% hydrolyzed animal protein ingredient, 20%-90% plant ingredient, 5%-50% meat ingredient and a chemical.

In an embodiment of the present disclosure, the Artificial Bully Stick (or Bully-Stick-LIKE) pet chew of the present disclosure includes 5%-25% pizzle, 50%-90% plant ingredient and a chemical.

In an embodiment of the present disclosure, the Artificial Bully Stick (or Bully-Stick-LIKE) pet chew of the present disclosure includes 3%-25% meat by-products, 50%-90% plant ingredient and a chemical.

In an embodiment of the present disclosure, the Artificial Bully Stick (or Bully-Stick-LIKE) pet chew of the present disclosure includes 5%-25% pizzle, 20%-50% plant ingredient, 10-50% animal-hide ingredient and a chemical.

Figure 13:
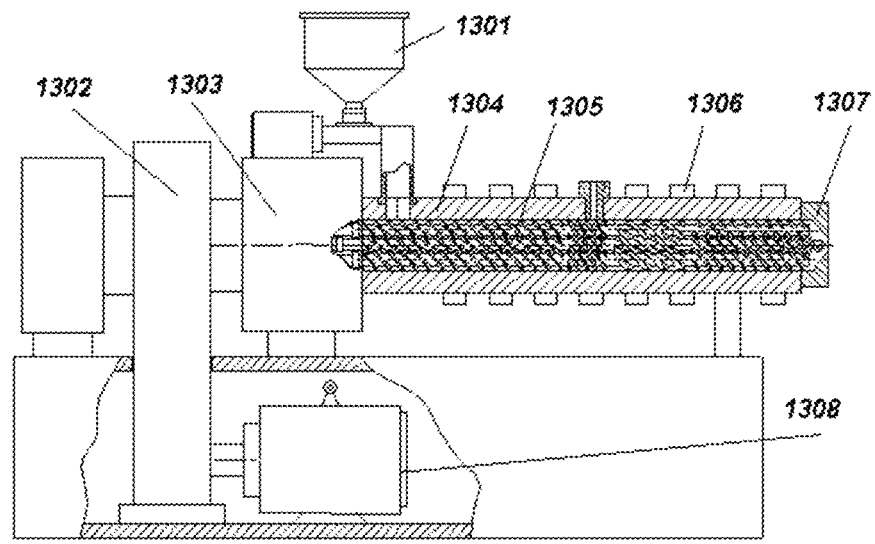
FIG. 13 is a prior art, a top plan view of a typical extruder, a machine system for producing pet chew products.

In one embodiment, the Artificial Bully Stick (or Bully-Stick-LIKE) pet chew is formed by extruding process with an extruder (typically co-extruding extruder system). The reasons for a preference of extruding process include: A, Extruding process can achieve an outer layer texture imitating that of traditional bully sticks. Extruding process is viewed as the best one. While being extruded, a pressure acts on the composition material which provides durability/texture to finished products; B, It is perfect for a stick shaped product. C, Extruding is a very efficient process, which provides a low cost processing for making the products; D, It provides large capacity for a single workshop with limited scale. Co-extruding may be a process to produce this pet chew stick product because co-extruding process can well provide two separate pet chew members (outer layer and inner member) with different quality, which imitates traditional bully sticks. Now refer to FIG. 13, a drawing of a typical extruder, a machine system for producing pet chew products. The components of the extruder are as follows: 1301—hopper, 1302—reduction gearbox, 1303—power distributor, 1305—screw, 1306—heater, 1307—extruder die and 1308—motor.

Although extrusion process may be beneficial in various circumstances to produce the artificial bully stick pet chews, a virtually unlimited variety of 3—dimensional shaped artificial bully stick products (bully stick analogue) can be produced by applying injection moulding techniques instead, in which the extrusion process is incapable. Injection moulding is a process whereby a thermoplastic material (such as the aforementioned composition material to form the artificial bully stick product) is fed into a heated barrel, mixed, and forced by injection into a cavity of a rigid frame called a mould, where it cools and hardens (sets) to the configuration of the cavity.

In some embodiments of the present disclosure, the pet chew sticks are formed by co—extruding process and the formula forming the outer layer is different from the one forming the inner member. The intention to apply different formulas to the outer layer and the inner member is to achieve different texture, and/or looking, and/or coloring, and/or durability/hardness, and/or density, etc., which could make a one distinguished from the other, imitating traditional bully stick products.

As a process for making the Artificial Bully Stick (or Bully—Stick—LIKE) pet chew of the present disclosure, it includes (from point A to D):

(A). Prepare composition A and B. (Composition A is for forming outer layer of the Artificial Bully Stick pet chew and Composition B is for forming inner member of the Artificial Bully Stick pet chew. At least one of A and B has meat—by—products ingredient (for example pizzle) ingredient in its formula. The whole pet chew formula may include 20%—50% plant ingredient, 10%—50% meat (meat by—product) ingredient and 5%—$^{25}$% pizzle)

(B). Deliver the Composition A and Composition B into a co—extrusion extruder, and heat the compositions in the extruder at a high temperature at least 40° C. before their being extruded at the extruder die to a stick form. Extrude the compositions with the extruder.

(C). Divide the extruded stick to pre—determined smaller sized ones with finished pet chew product form.

(D). Dry and harden the product by heating for sufficient time and obtain a final finished dog chew product. Moisture of final finished products is 8%—$^{18}$%.

Here are some embodiments of the present disclosure in various pet chew shapes/configurations.

Figure 2:
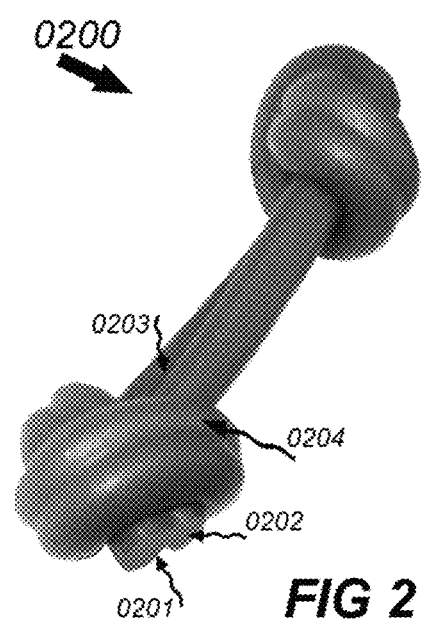
FIG. 2 is a top plan view of an Artificial Bully Stick pet chew according to the disclosure in a knotted bone shape, whose chew stick is formed from a single piece of material.

Now refer to FIG. 2, 0200 is an embodiment of the present disclosure, an edible pet chew formed from a member of Artificial Bully Stick in a form of knotted bone shape. 0202 is a side on one end of the chew in a shape of capital "B". 0203 refers to the groove configuration existing in the Artificial Bully Stick member. It may be formed by an extrusion process. A composition material is fed to an extrusion with an extruder die with a capital "B"—shaped opening and when it leaves the extruder die it is in a shape of stick. The stick shaped item is then manipulated (by hand) to a knotted bone product before the material is hardened.

Now refer to FIG. 3, 0300 is an embodiment of the present disclosure, an edible pet chew with three separate Artificial Bully Stick chew sticks (0301, 0302 and 0303) woven together. 0305 is a groove existing in chew stick 0302. 0306 is a groove existing in chew stick 0303.

Now refer to FIG. 4, 0400 is an embodiment of the present disclosure, an Artificial Bully Stick pet chew in braid shape formed from two pieces of rawhide sheets 0411 and a member of Artificial Bully Stick 0410. 0403 is a groove existing in the chew stick.

Figure 5:
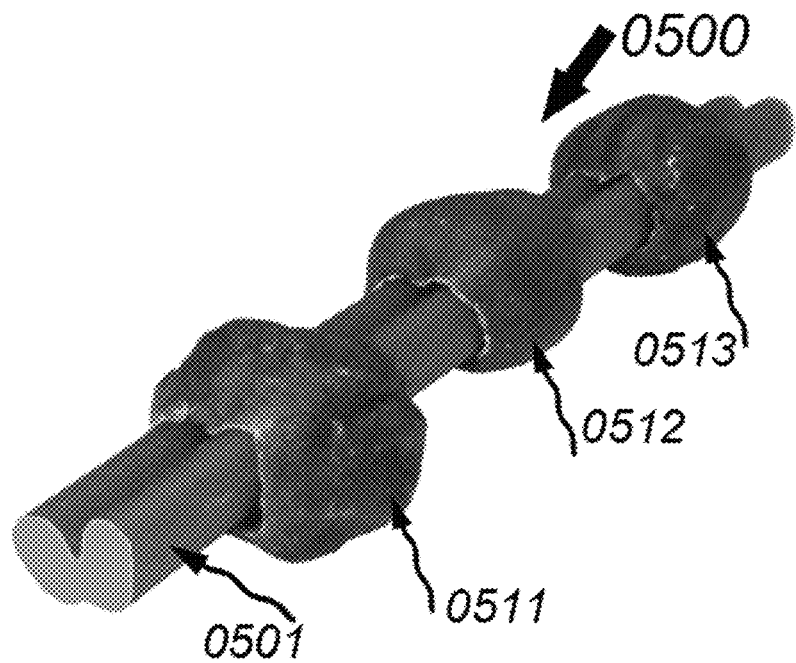
FIG. 5 is a top plan view of a kabob-form edible pet chew according to the disclosure with a member of Artificial Bully Stick chew stick 0501 and three members of composition balls 0511/0512/0513.

Now refer to FIG. 5. 0500 is a kabob—configuration edible pet chew with a member of Artificial Bully Stick chew stick 0501 and three members of balls 0511/0512/0513 which are formed from an edible composition material. Members of 0511/0512/0513 are hand—made dough (balls) with ingredients including chicken breast (30%—60%), plant protein, rice flour, glycerin, being attached to chew stick 0501. Member of chew stick 0501 is a chew stick, same as 0100 in FIG. 1. The number of composition ball may also vary from 1 to 5 as desired. The Artificial Bully Stick chew stick member 0501 is formed from a single piece of material with a cross section shape similar to capital letter "B", same as the shape figure as illustrated in FIG. 14 (1400F).

In some embodiments of the present disclosure, an Edible Material member is applied together with a member of Artificial Bully Stick chew stick 0100, where the edible material member and the Artificial Bully Stick member are assembled together to form a pet chew. The Artificial Bully Stick chew stick 0100 may be reshaped by hand to a new shape before it gets hardened while being assembled with the edible material member according to desired finished pet chew structure.

In some embodiments of the present disclosure, a member of animal hide (say rawhide) may be applied together with a member of Artificial Bully Stick chew stick 0100, where the animal hide (say rawhide) member and the Artificial Bully Stick member are assembled together to form a pet chew. The Artificial Bully Stick chew stick 0100 may be pre—shaped to a new shape before being assembled with the animal hide member according to desired finished pet chew structure. Now refer to FIG. 4, an edible pet 0400 is created with a member of Artificial—Bully—Stick 0410 and a rawhide member 0411 assembled together.

In yet some embodiments of the present disclosure, a member of Genuine Animal Pizzle material may be applied together with a member of Artificial Bully Stick chew stick 0100, where the Genuine animal Pizzle material member and the Artificial Bully Stick member are assembled together to form a pet chew.

Figure 10:
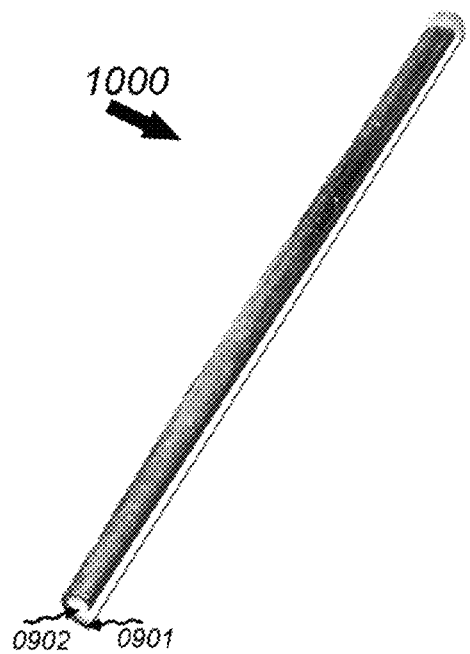
FIG. 10 is a prior art, a top plan view of a traditional bully stick product which is formed by splitting pet chew of 0900.

In the trade of traditional bully stick, sometimes original bully stick is longitudinally split to several separate pieces of slimmer sticks with desired diameters. The slimmer sticks are packed as final products for consumers. Product 1000 in FIG. 10 (Prior Art) is an example of this split bully stick. 0901 in FIG. 10 derives from original 0901 from FIG. 9 which is the outer layer of the bully stick. 0902 in FIG. 10 derives from original 0902 from FIG. 9 which is the inner member of the bully stick. In some embodiments of the present disclosure, Artificial Bully Stick pet chew imitates the traditional bully stick that is longitudinally split traditional bully stick as above—described.

As a formula embodiment to form the composition to produce the Artificial Bully Stick (or Bully—Stick—LIKE) pet chew stick, the composition is consisting of. Rice flour (67.2%, classified as plant ingredient), vegetable glycerin (8%), gelatin (7%), fresh chicken breast (5% classified as meat ingredient), ground bovine tendon (3%, classified as meat—by—products ingredient), cellulose powder (2%, classified as plant ingredient), calcium carbonate (2%), sweet potato (2%, classified as plant ingredient), lecithin (1%), carrageenan gun (1%), hydrolyzed pizzle (0.5% classified as meat—by—products ingredient), brewers yeast (0.5%), titanium dioxide (0.4%), FD&C yellow 6 (0.2%), FD&C red 40 (0.1%), FD&C blue 1 (0.1%). In this formula, meat—by—products ingredient occupies 3.5% in the formula, plant ingredient totally 71.2%, and meat 5%. Vegetable glycerin, calcium carbonate and carrageenan gum are some chemicals.

As another formula embodiment to form the composition to produce the Artificial Bully Stick (or Bully—Stick—LIKE) pet chew stick, the composition is consisting of: Rice flour (43.6%, classified as plant ingredient), fresh chicken breast (30%, classified as meat ingredient), vegetable glycerin (8%), gelatin (7%), chicken cartilage (2% classified as meat ingredient), cellulose powder (2%, classified as plant ingredient), calcium carbonate (2%), sweet potato (2%, classified as plant ingredient), lecithin (1%), carrageenan gum (1%), brewers yeast (1%), titanium dioxide (0.4%). In this formula, plant ingredient occupies totally 47.6% in the formula, and meat totally 32%. Vegetable glycerin, calcium carbonate and carrageenan gun are some chemicals.

As another formula embodiment to form the composition to produce the Artificial Bully Stick (or Bully—Stick—LIKE) pet chew stick, the composition is consisting of: Fresh chicken breast (28.00%, classified as meat ingredient), tapioca starch (20.00%, classified as plant ingredient), ground pizzle (12.00%, classified as pizzle ingredient), gelatin (12.00%), vegetable glycerin (8.00%), rawhide (5.00%), sorbitol (3.60%), cellulose powder (3.00%, classified as plant ingredient), calcium carbonate (3.00%), sweet potato (2.00%, classified as plant ingredient), lecithin (1.00%), carrageenan gum (1.00%), brewers yeast (1.00%), titanium dioxide (0.40%). In this formula, pizzle ingredient occupies 12% in the formula, meat 28% and plant ingredient totally 25%. Vegetable glycerin, sorbitol, calcium carbonate and carrageenan gun are some chemicals.

What is claimed is:

1. An edible pet chew, comprising:
an artificial dehydrated pizzle member for imitating a dehydrated animal pizzle product, wherein said artificial dehydrated pizzle member is in a form imitating a shape of a dehydrated animal pizzle product, wherein said artificial dehydrated pizzle member is formed from a single piece of material, wherein said artificial dehydrated pizzle member has a groove longitudinally on its surface, wherein said groove is visible in final end product, wherein said artificial dehydrated pizzle member is formed from a composition material, wherein said composition material comprises at least 20% plant ingredient by weight in its formula, and wherein said edible pet chew is free of a distinct rawhide sheet member in the final end product.

2. The edible pet chew, as recited in claim 1, wherein said composition material further comprises an animal pizzle ingredient in its formula.

3. The edible pet chew, as recited in claim 2, wherein said composition material comprises at least 3% said animal pizzle ingredient by weight on an as formulated basis in the formula.

4. The edible pet chew, as recited in claim 1, wherein said artificial dehydrated pizzle member has a hole inside running through the length of said artificial dehydrated pizzle member.

5. The edible pet chew, as recited in claim 1, wherein said artificial dehydrated pizzle member has a plurality of bubbles inside spread into a body of said artificial dehydrated pizzle member.

6. The edible pet chew, as recited in claim 1, wherein said composition material further comprises an animal ingredient, wherein said animal ingredient is a meat or meat by—products ingredient.

7. The edible pet chew, as recited in claim 1, wherein said composition material comprises 20%—90% said plant ingredient by weight on an as formulated basis in the formula.

8. The edible pet chew, as recited in claim 3, wherein said composition material comprises 50%—90% said plant ingredient by weight on an as formulated basis and 5%—25% said animal pizzle ingredient by weight on an as formulated basis.

9. The edible pet chew, as recited in claim 6, wherein said animal ingredient is a meat by—products ingredient, wherein said composition material comprises 3%—50% said meat by—products ingredient by weight on an as formulated basis.

10. The edible pet chew, as recited in claim 6, wherein said animal ingredient is a meat ingredient, wherein said composition material comprises 3%—50% said meat ingredient by weight on an as formulated basis.

11. The edible pet chew, as recited in claim 1, wherein said composition material comprises 20%—50% said plant ingredient by weight on an as formulated basis and 10%—50% said meat ingredient by weight on an as formulated basis.

12. The edible pet chew, as recited in claim 1, wherein said composition material further comprises a hydrolyzed animal protein ingredient.

13. The edible pet chew, as recited in claim 1, wherein said plant ingredient is an ingredient selected from the group consisting of: vegetables, fruit, edible—plant—derived materials, vegetable—derived materials, fruit—derived materials, plant protein, vegetable protein, plant starch, vegetable starch, grains, cereals, corn, sweet potato, gluten—free edible plant, and gluten—free vegetables.

14. The edible pet chew, as recited in claim 6, wherein said composition material further comprises a chemical, wherein said composition material comprises 10%—50% said meat or 10%—50% said meat by—product ingredient on an as formulated basis in the formula by weight;
wherein said meat ingredient is selected from the group consisting of: animal flesh, animal muscle, poultry meat, chicken, chicken breast, duck, goose, turkey, venison, porcine meat, pork, bovine meat, beef, mutton, lamb, goat meat, fish, meat meal, chicken meat, fish meat, hydrolyzed meat protein, hydrolyzed animal material, hydrolyzed animal protein, meat derived ingredient, and poultry derived ingredient,
wherein said meat by—product ingredient is selected from the group consisting of: animal pizzle, porcine meat by—product, poultry by—product, bovine meat by—product, animal viscera, animal stomach, animal tongue, animal kidney, animal blood, animal bone, partially defatted low temperature fatty tissue, animal intestines, animal spleen, animal liver, animal lung, animal heart, meat by—product meal, poultry by—product meal, hydrolyzed meat—by—products protein, hydrolyzed meat—by—products material, meat by—product derived ingredient, poultry by—product derived ingredient, animal fat, and animal oil.

15. The edible pet chew, as recited in claim 1, wherein said edible pet chew further comprises an edible material member, wherein said artificial dehydrated pizzle member and said edible material member are assembled together to form the final end product.

16. The edible pet chew, as recited in claim 1, wherein said artificial dehydrated pizzle member is knotted at first and second longitudinal ends, wherein said first and second longitudinal ends have knots thereat respectively.

17. The edible pet chew, as recited in claim 15, wherein said edible material member is a second piece of artificial dehydrated pizzle member, wherein said artificial dehydrated pizzle member and said second piece of artificial dehydrated pizzle members are woven together to make the final end product in a braid form.

18. The edible pet chew, as recited in claim 1, wherein in final product said artificial dehydrated pizzle member is shaped to any one of: a twisted stick shape, a spiral shape, a pretzel knot shape, a knotted bone shape, a ring shape, a woven braid shape and a stick shape.

19. The edible pet chew, as recited in claim 1, wherein a cross section of said artificial dehydrated pizzle member is in a shape similar to capital letter B, Arabic numeral 8, peanut icon, cashew nut icon or heart icon.

* * * * *